United States Patent
Kaneko et al.

(10) Patent No.: US 7,031,586 B2
(45) Date of Patent: Apr. 18, 2006

(54) OPTICAL WAVEGUIDE DEVICE AND METHOD OF MANUFACTURE THEREOF

(75) Inventors: Taro Kaneko, Minato-ku (JP); Takuya Anzawa, Minato-ku (JP)

(73) Assignee: NEC Corporation, (JP)

( * ) Notice: Subject to any disclaimer, the term of this patent is extended or adjusted under 35 U.S.C. 154(b) by 0 days.

(21) Appl. No.: 11/122,170

(22) Filed: May 4, 2005

(65) Prior Publication Data

US 2005/0201671 A1 Sep. 15, 2005

Related U.S. Application Data

(62) Division of application No. 10/403,320, filed on Mar. 28, 2003, now Pat. No. 6,895,135.

(30) Foreign Application Priority Data

Mar. 28, 2002 (JP) ............................... 2002-90576

(51) Int. Cl.
*G02B 6/10* (2006.01)

(52) U.S. Cl. .................. 385/129; 385/14; 385/31; 385/130; 385/131; 385/132; 359/129

(58) Field of Classification Search .................. 385/14, 385/31, 129–132; 359/129
See application file for complete search history.

(56) References Cited

U.S. PATENT DOCUMENTS 5,680,236 A  10/1997  Van Der Tol .................. 398/79
6,208,791 B1 *  3/2001  Bischel et al. ............... 385/129
6,661,939 B1 * 12/2003  Kaneko et al. ................ 385/14
2004/0160597 A1 *  8/2004  Tsai et al. ..................... 356/129

FOREIGN PATENT DOCUMENTS

JP          402090108 A   *   3/1990   .................. 385/14

OTHER PUBLICATIONS 8-channel Wavelength Division Multiplexing Photoreceiver Using 4 Planar Lightwave☐☐Circuit (PLC) Platform, Fifth Optoelectronics & Communications Conf Technical Digest, Jul. 2000, Makuhari Messe.*

*8-Channel Wavelength Division Multiplexing Photoreceiver Using A Planar Lightwave Circuit (PLC) Platform*, Fifth Optoelectronics & Communications Conf. Technical Digest, Jul. 2000, Makuhari Messe.

* cited by examiner

*Primary Examiner*—Brian Healy
*Assistant Examiner*—Jerry Martin Blevins
(74) *Attorney, Agent, or Firm*—Ostrolenk, Faber, Gerb & Soffen, LLP

(57) ABSTRACT

An optical waveguide device includes a substrate, a metal layer arranged on the substrate, at least claddings arranged on the metal layer and in the claddings dents are formed, at least cores arranged in the claddings, whose end faces are exposed on the sides of the dents, for transmitting lights, optically non-transmissive material coating the inside faces of the dents except the sides on which the end faces of the cores are exposed, at least light receiving elements for receiving lights emitted from the end faces of the cores and inputting the lights into light receiving faces of the light receiving elements.

8 Claims, 12 Drawing Sheets

OPTICAL WAVEGUIDE DEVICE AND METHOD OF MANUFACTURE THEREOF

CROSS REFERENCE TO RELATED APPLICATION

This application is a divisional of U.S. application Ser. No. 10/403,320 filed March 28, 2003 entitled OPTICAL WAVEGUIDE DEVICE AND METHOD OF MANUFACTURE THEREOF, U.S. Pat. No. 6,895,135, which claims the benefit of Japanese Application No. 90576/2002 filed on Mar, 28, 2002, the contents of which are incorporated by this reference.

BACKGROUND OF THE INVENTION

1. Field of the Invention

The present invention relates to an optical waveguide device and a method of manufacture thereof, and more particularly to an optical waveguide device enabled to eliminate or reduce the influences of stray lights and a method of manufacture thereof.

2. Description of the Related Art

Communication technology is advancing dramatically, driven by the development of the Internet among other factors. Along with that, optical devices are required rapidly to achieve high performance and miniaturization. In order to realize this requirement, hybrid mounting of optical devices is performed briskly. One example is an optical device in which optical functional elements such as laser diodes (LDs), photodiodes (PDs) and optical amplifiers for receiving optical signals are hybrid-mounted on a planar lightwave circuit (PLC) chip.

In addition recently, in compliance with the demand for large increasing capacity in communication capacity, wavelength division multiplexing (WDM) communication is developing. For this purpose, it is frequently attempted to mount components for a plurality of channels on a single optical waveguide substrate. As an example, a plurality of light receiving elements are hybrid-mounted on an arrayed waveguide grating (AWG) as a trial production as disclosed in U.S. Pat. No. 5,680,236 (OECC2000 Tech Digest, Jul. 2000, 12C2-2). In such hybrid mounting, optical functional elements are fixed to an end face or the top face of an optical waveguide substrate by soldering or with adhesive. As for such integrated structure, lights leaking from each section of components easily enter into other sections of components as stray lights. This results in optical crosstalk. There are a number of known measures to prevent such optical crosstalk from increasing. For instance, where there are multiple channels, it is a general practice to expand the spacing between optical waveguides or components to be mounted in a fan-out structure.

FIG. 12 illustrates the structure of an optical device proposed to reduce optical crosstalk according to the prior art. On the optical waveguide substrate 101 of an optical waveguide device 100 are formed a plurality of optical waveguides $102_1, 102_2, \ldots 102_N$. At one end of each of the optical waveguides $102_1, 102_2, \ldots 102_N$ is arranged a matching one of light receiving elements $103_1, 103_2, \ldots 103_N$ for the respective channels. Lights being inputted from the left ends of, and being transmitted in, the optical waveguides are received by the respective light receiving elements. In this proposed configuration, the spacing between the optical waveguides $102_1, 102_2, \ldots 102_N$ is radially expanded as they approach the light receiving elements $103_1, 103_2, \ldots 103_N$. This arrangement makes it possible to expand the spacing between the light receiving elements $103_1, 103_2, \ldots 103_N$. As a result, stray lights from the optical waveguides having failed to be inputted into the light receiving elements can be prevented from being inputted into light receiving elements of other channels, and optical crosstalk can be thereby reduced. However, the structure according to the prior art shown in FIG. 12 has its own problem that the optical waveguide substrate has to be enlarged with an increase in the number of channels because the mounting width of light receiving elements expands. For this reason, the number of optical waveguide substrates that can be cut out of a wafer is reduced, and the cost is accordingly increased. There is another problem that the package to mount this optical waveguide substrate cannot be miniaturized.

Also, as shown in FIG. 12, it is often impossible to achieve a sufficient effect by simply expanding the spacing between components.

SUMMARY OF THE INVENTION

An object of the present invention is to provide an optical waveguide device which is capable of reducing optical crosstalk without having to expand the spacing between the plurality of optical functional elements mounted on an optical waveguide substrate and a method of manufacture thereof.

An optical waveguide device according to the invention is provided with optical waveguides whose cores are arranged in a plurality in claddings formed on a substrate and light receiving elements for receiving lights emitted from these cores respectively, wherein a metal layer is formed between the substrate and the claddings, and grooves are formed between the cores by removing of the claddings. The insides of these grooves are coated with optically non-transmissive material, and the top faces of the claddings are coated with optically non-transmissive and electrically insulating material. Furthermore, the optically non-transmissive material is coated by a film forming process, and the optically non-transmissive and electrically insulating material is coated by painting. Optical paths from the end faces of the cores to the light receiving faces and the surroundings of the light receiving elements are filled with optically transmissive and electrically insulating material, whose top parts are either coated with optically transmissive and electrically insulating material or blocked from one another. In the optical waveguides, there are formed dents in which the end faces of the plurality of cores are exposed, and the insides of the dents are coated with optically non-transmissive material except on the faces where the end faces of the cores are exposed. This coating of the insides of the dents is coated by a film formation process in a direction slanted relative to the top faces of the claddings. Furthermore, the dents are provided with mirrors to reflect lights emitted from the end faces of the cores and to make to input them into the light receiving light receiving faces of the light receiving elements. In addition, the light receiving elements are divided into odd-number and even-number groups, which are arranged with some spacing between them and blocked by optically non-transmissive material.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

The basic configuration and operating principle of the optical waveguide device according to the invention will be described below.

Figure 1:
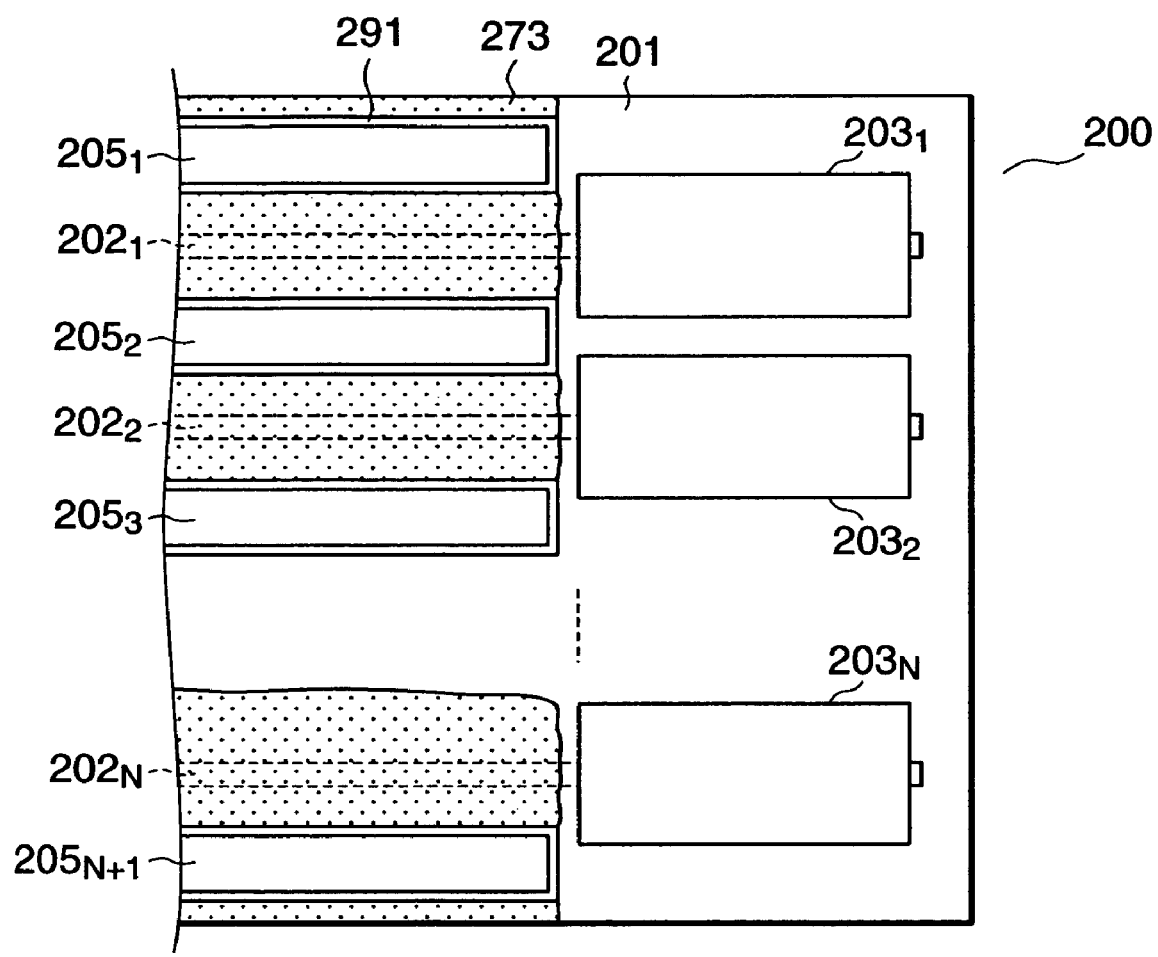
FIG. 1 shows a plan of an optical waveguide device, which is a first preferred embodiment of the invention.
Figure 2:
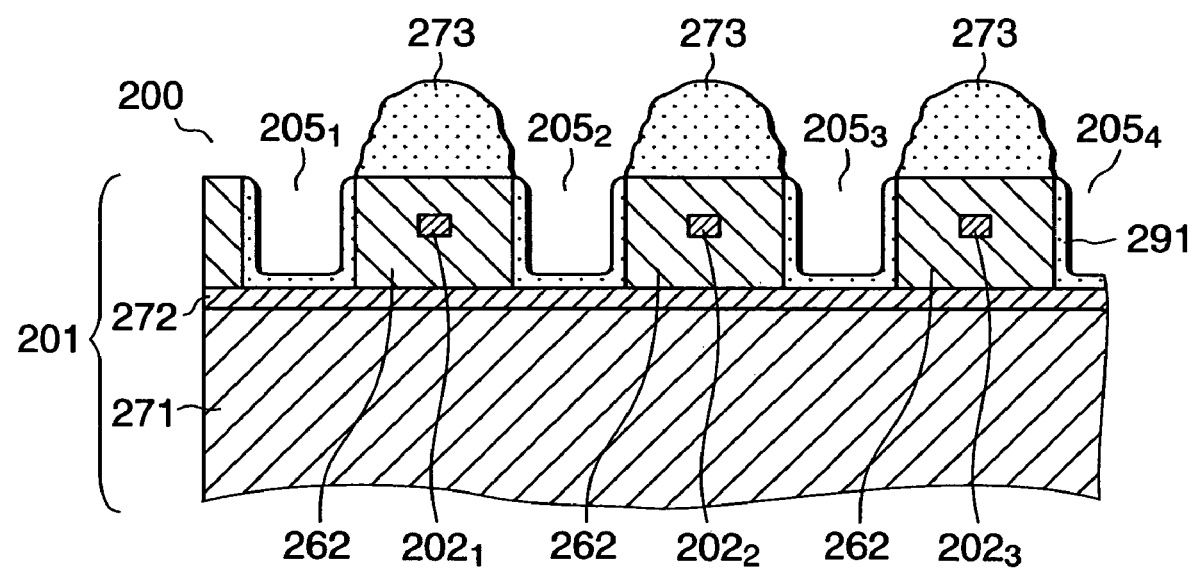
FIG. 2 shows a vertical section of the surroundings of first through third optical waveguides of FIG. 1.
Figure 3:
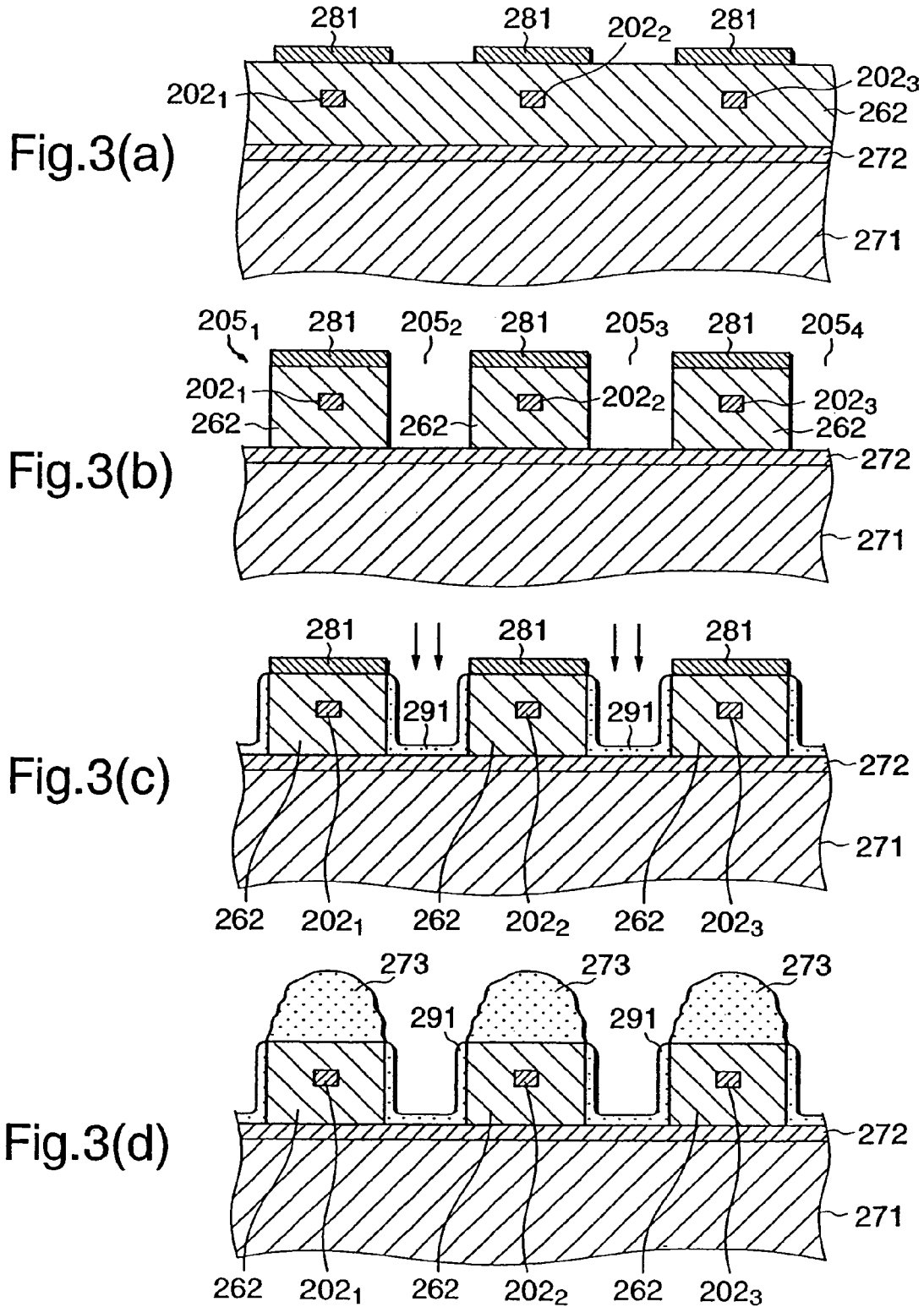
FIGS. 3(a) through 3(d) show vertical sections of the manufacturing process of the surroundings of first through third optical waveguides of FIG. 1.

FIG. 1 illustrates the substrate configuration of the optical waveguide device according to the invention. In the optical waveguide substrate 201 of an optical waveguide device 200 according to the invention, first through Nth, cores (cores of optical waveguides) $202_1$, $202_2$, . . . $202_N$ are formed in parallel to one another. At the righthand ends of these first through Nth cores $202_1$, $202_2$, . . . $202_N$ are respectively arranged first through Nth light receiving elements $203_1$, $203_2$, . . . $203_N$. In intermediate positions of the first through Nth cores $202_1$, $202_2$, . . . $202_N$ and outside the first and Nth cores $202_1$ and $202_N$, and in parallel to them, are arranged interception grooves $205_1$ through $205_{N+1}$. The inside faces of these interception grooves $205_1$ through $205_{N+1}$ are coated with optical blocking material 291. FIG. 2 shows a cross section of the first through third cores and the interception grooves around, cut in a direction at a right angle to the transmitting direction of signal light. The structure is such that the interception grooves $205_1$, $205_2$, $205_3$ and $205_4$ are sequentially arranged in order on both sides of one of the first through third cores $202_1$, $202_2$ and $202_3$ between them. The inside faces of these interception grooves $205_1$ through $205_4$ are coated with the optical blocking material 291. Between a substrate layer 271 and claddings 262 is formed a metal layer 272, and on the top face of each of the claddings 262 is stacked optical blocking material 273 consisting of optical blocking resin. This optical blocking material 273 is an insulator so that, even if it comes into contact with an electrode (not shown), no short circuiting may occur, and its equivalent refractive index is close to that of the claddings or value the above that (the claddings of the optical waveguides) so that lights leaking to the claddings can be effectively absorbed. As a result, lights leaking to the claddings can be readily absorbed by the optical blocking material without being reflected by the boundary face with the optical blocking material. Thus each of the claddings 262 is optically independent of the matching one of the cores $202_1$ through $202_3$. For this reason, no lights leaking from the cores $202_1$ through $202_3$ to the claddings 262 leak out of the claddings 262. Therefore, stray lights can be prevented from entering into any other channel and thereby worsening optical crosstalk. Furthermore, since the inside faces of the grooves are process-formed, they afford high productivity and can be adequately coated even if the grooves are very fine. On the other hand, since the top faces of the claddings are coated with insulating material, even if they come into contact with an electrode pattern or the like, no short circuiting can occur. Moreover, because only the top faces of the claddings are coated, highly viscous coating material can be used. In addition, the fourth through Nth cores and their surroundings are configured in the same way as those illustrated in FIG. 2. FIG. 3 illustrate a manufacturing process of the parts shown in FIG. 2.

FIG. 3(a) illustrates a state in which the metal layer 272 is formed over the top face of the substrate layer 271, the claddings 262 and the cores $202_1$, $202_2$ and $202_3$ are formed still on it, and masking material 281 having a prescribed width is formed over the top faces of the claddings 262 so as to cover the cores $202_1$, $202_2$ and $202_3$. The masking material 281 consists of metal or resist. As shown in FIG. 3(b), using a reactive ion etching (RIE) apparatus, the interception grooves $205_1$, $205_2$, $205_3$ and $205_4$ are formed.

Then, as shown in FIG. 3(c), the grooves are coated inside with the optical blocking material 291 by vapor deposition, sputtering or otherwise.

Further as shown in FIG. 3(d), the masking material 281 is removed, and the optical blocking material 273 is adhered, resulting in the realization of the structure illustrated in FIG. 2.

Incidentally, instead of coating the top faces of the claddings 262 with the optical blocking material, the masking material 281 may be removed after the step shown in FIG. 3(b), and the inside faces of the interception grooves $205_1$ through $205_4$ and the top faces of the claddings 262 may be formed simultaneously of the optical blocking material 291.

In addition, the optical blocking material 291 can be metal, metal-doped glass or ceramic. The optical blocking material 273 may be ceramic, metal-doped glass or resin. The preferable metal is Au, Pt or Cr in terms of coat stability, or Ti, Pt, Ni or W in terms of low optical transmissivity. Some other metal or alloy may also fit the purpose. Suitable ceramics include silicon carbide, silicon nitride, or the like. Preferable metal-doped glasses include, for instance, doped quartz with high Ti and Ge contains. A suitable resin may be epoxy resin, or the like.

Figure 4:
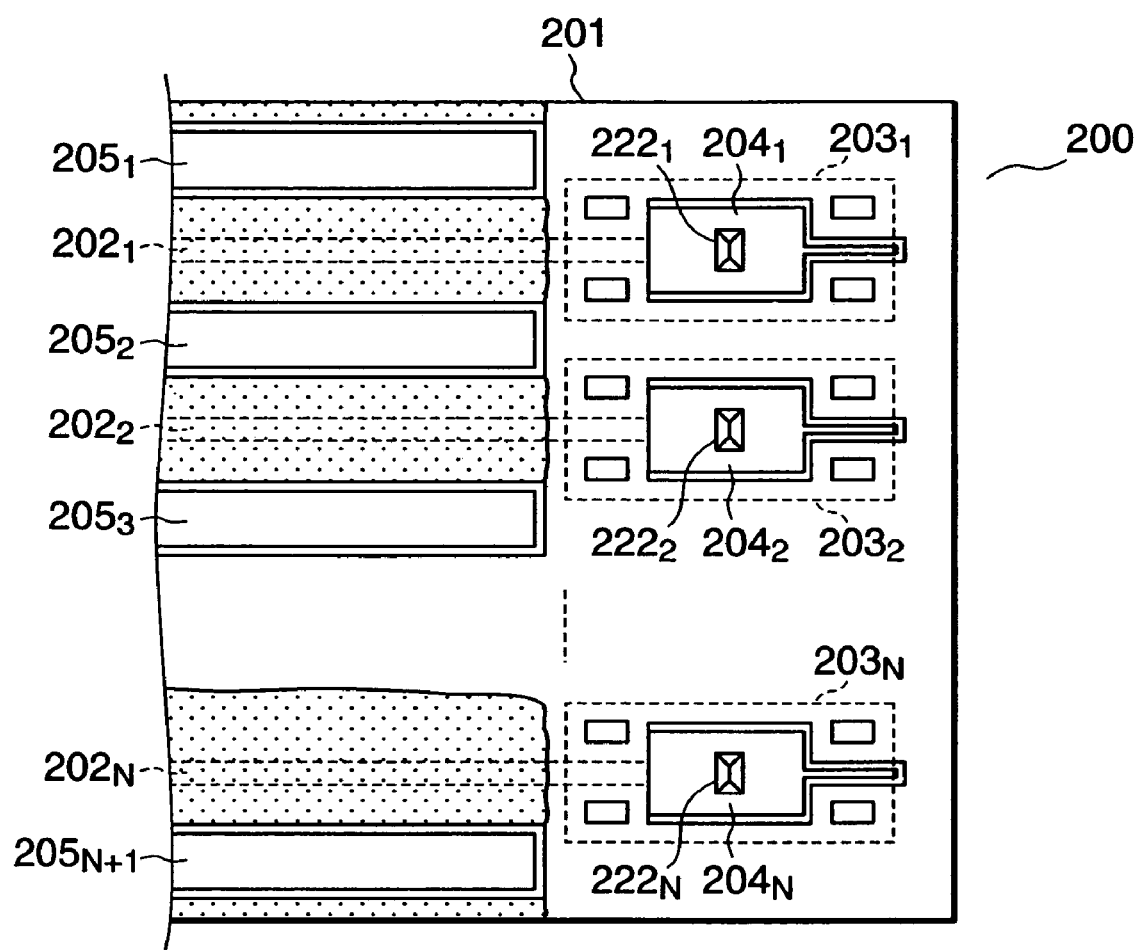
FIG. 4 shows a plan of a substrate of the optical waveguide device which is the first preferred embodiment of the invention.

FIG. 4 illustrates the optical waveguide substrate of the optical waveguide device according to the invention. In the optical waveguide substrate 201 of the optical waveguide 200 according to the invention, first through Nth dents $204_1$, $204_2$, . . . $204_N$ are formed in the positions where the first through Nth light receiving elements $203_1$, $203_2$, . . . $203_N$ are formed so as to expose the end faces of the cores respectively. In these dents $204_1$, $204_2$, . . . $204_N$ are mounted mirrors $222_1$, $222_2$, ... $222_N$ to reflect lights emitted from the ends of the cores $202_1$, $202_2$, ... $202_N$ toward the light receiving faces of the light receiving elements $203_1$, $203_2$, ... $203_N$.

Figure 5:
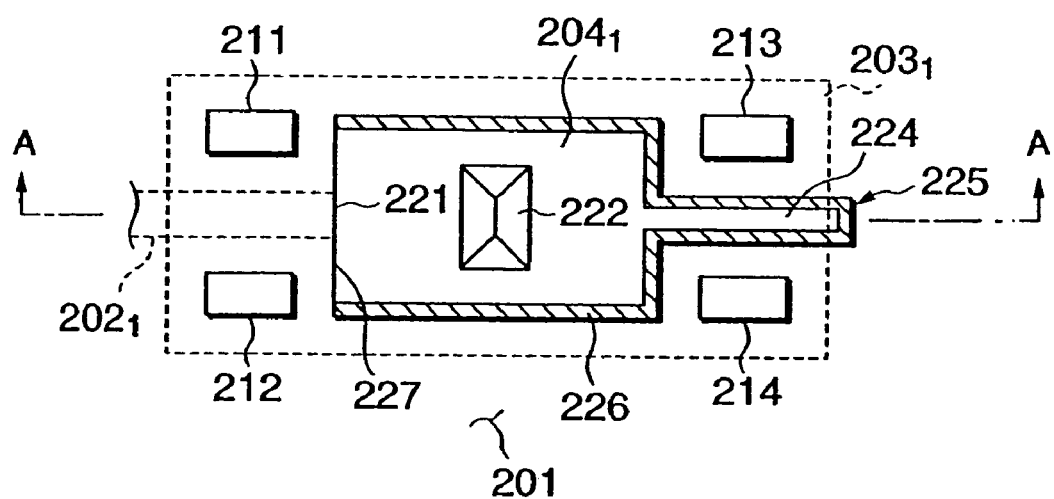
FIG. 5 shows a plan of the surroundings of the mounting of light receiving elements of FIG. 4.
Figure 6:
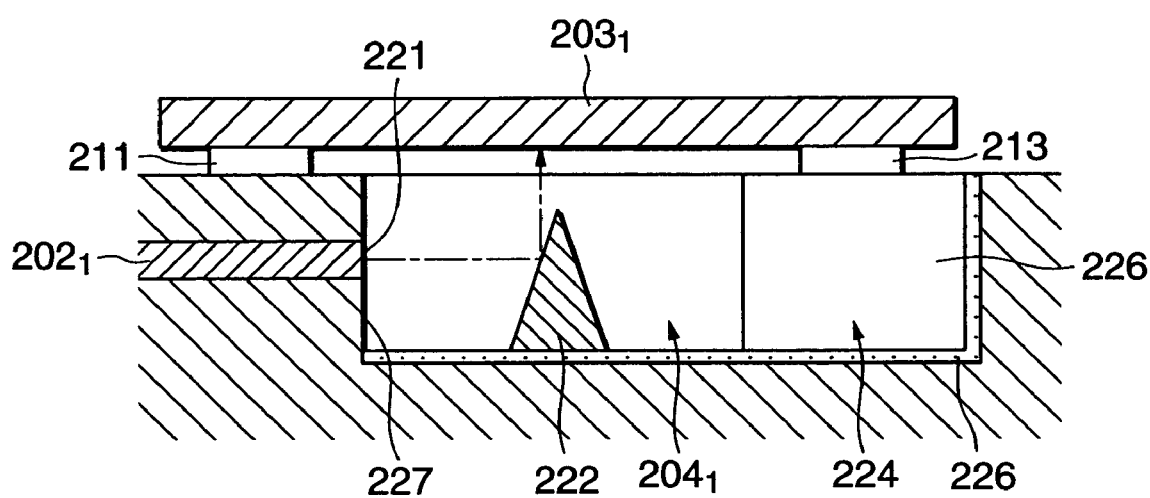
FIG. 6 shows a cross section in the A—A direction in FIG. 5.

FIG. 5 shows an enlarged view of the surroundings of the position in which the first light receiving element $203_1$ is fitted to the optical waveguide substrate 201, and FIG. 6, a cross section in the A—A direction in FIG. 5. The positions in which the second through Nth light receiving elements $203_2$ ... $203_N$ are fitted are structured in the same way as the position in which the first light receiving element $203_1$, is fitted.

As shown in FIG. 5, the pedestals 211 through 214 are formed on the optical waveguide substrate 201 in the position where the first light receiving element $203_1$ is mounted. These pedestals 211 through 214, as illustrated in FIG. 6, are formed convexly on the top face of the optical waveguide substrate 201.

The first light receiving element $203_1$ is fixed over these pedestals 211 through 214. The pedestals 211 through 214 are also used as terminals for taking electrical signals out of the first light receiving element $203_1$. An end face 221 of the first core $202_1$ is exposed on a wall surface 227 of the dent $204_1$. On the bottom face of the dent $204_1$ is installed the mirror 222. Further as shown in FIG. 5, on the right hand side of the dent $204_1$ is formed a groove 224 by extending the dent. The righthand end 225 of the groove 224 extends so long as to be slightly exposed from the righthand end of the first light receiving element $203_1$ which covers the groove. Also, over the inside face of the dent $204_1$, except the wall surface 227, is formed a film of optical blocking material 226. A film of optical blocking material 226 is also formed over the inside face of the groove 224. The pedestals 211 through 214 are formed of the same material as the first core $202_1$ over the surface of the optical waveguide substrate 201. Incidentally, it is also possible to form the pedestals 211 through 214 at a separate step.

FIGS. 7 illustrate the process of forming a film of optical blocking material over all the faces but one of each dent. Here is schematically shown the dent $204_1$ illustrated in FIG. 5 and FIG. 6.

Figure 7A:
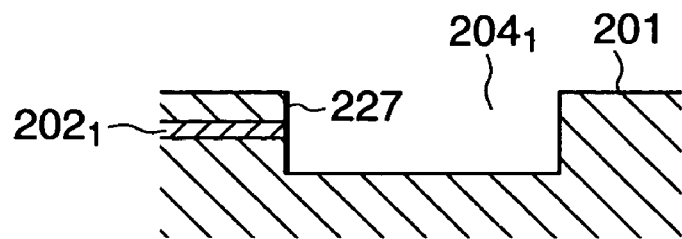
FIG. 7(a) showing the state before film formation and FIGS. 7(b) and 7(c) showing the states during film formation by different methods.
Figure 7B:
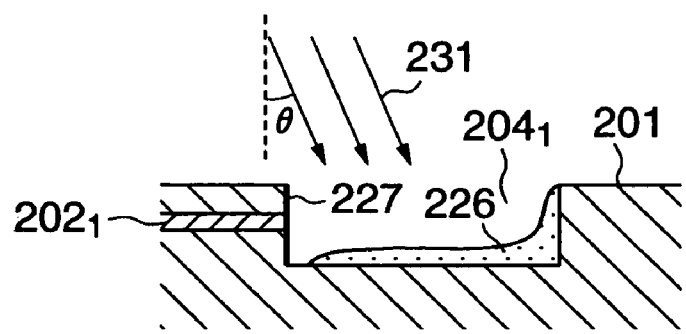
FIG. 7 show cross sections of the process of producing the optical waveguide device, which is the first embodiment of the invention.

FIG. 7(a) shows a section of the dent $204_1$ before the optical blocking material film is formed. On the wall surface 227 is exposed an end face of the first core $202_1$. In this state, the optical blocking material is vapor-deposited into the dent $204_1$ at an angle indicated by an arrow 231 as shown in FIG. 7(b). The angle θ formed by the arrow 231 to the direction normal to the top face of the optical waveguide substrate 201 is supposed to be 15 degrees, though this angle θ can be varied from 0 degree (perpendicular) to 90 degrees (horizontal) as desired. This enables the film of optical blocking material to be vapor-deposited on all the faces of the dent $204_1$ but the wall surface 227. It is also possible to similarly form the film optical blocking material by sputtering.

The reason why the wall surface 227 is excluded from vapor deposition is that obstruction of light emission from the first core $202_1$ can be thereby prevented. The formation of the film of optical blocking material over all the other faces than the wall surface 227 is, as illustrated in FIG. 6, to prevent lights not being inputted on the first light receiving element $203_1$, out of the lights being inputted from the end face 221 of the first core $202_1$ on the dent $204_1$, from becoming stray lights and being inputted into other dents to affect other channels. The film of optical blocking material formed over the dent $204_1$ is made of metal or some other light-absorptive material. The metal can be chosen from Au, Pt, Cr, Ti, Pt, Ni, W and alloys, and available light-absorptive materials include ceramics, such as silicon carbide and silicon nitride, and glasses heavily doped with metals such as Ti and Ge.

Figure 7C:
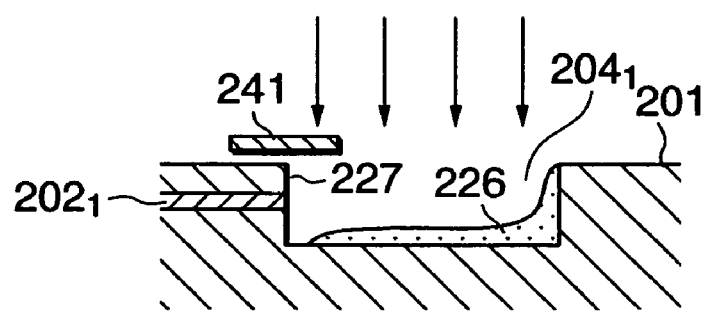

FIG. 7(c) illustrates another method of forming a film of optical blocking material in the dent. FIG. 7(b) shows vapor deposition in a slanted direction. On the other hand, FIG. 7(c) illustrates vapor deposition over the other faces than the wall surface 227 by arranging a masking member 241 over the wall surface 227.

In this embodiment of the invention, the film is vapor-deposited over the dent $204_1$ and the groove 224 by the method shown in FIGS. 7, followed by installation of the mirror 222 shown in FIG. 6 on the bottom face of the dent $204_1$. Use of gold both for the film to be vapor-deposited and the mirror also provides the vapor-deposited gold to perform the function of fixing the mirror securely. In addition, it is also possible to form the mirror surface and the inside faces of the dent 204, by arranging on the bottom face of the dent 204, in advance a projection which would eventually constitute the mirror and then vapor-depositing metal with a high reflection factor, such as gold.

After forming the optical blocking material film 226 over the dent $204_1$ and installing the mirror 222, the first light receiving element $203_1$ is fixed to the pedestals 211 through 214 as shown in FIG. 6.

In addition, a prescribed one of the pedestals 211 through 214 is connected to an electrode pattern (not shown) on the optical waveguide substrate 201, and the light reception output of the first light receiving element $203_1$ can be supplied to circuit portions (not shown) via this electrode pattern.

Figure 8A:
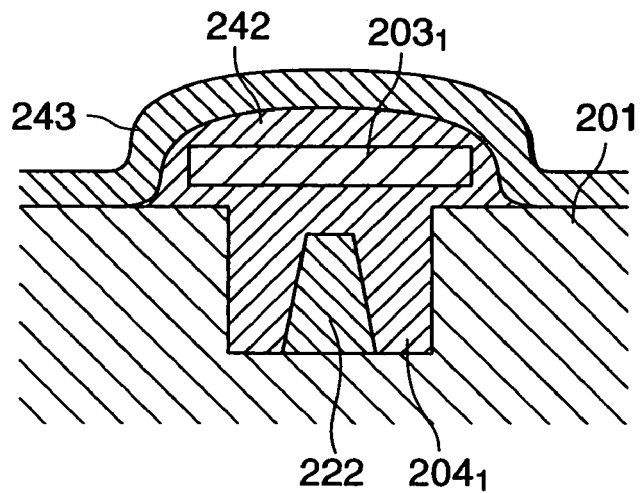
FIG. 8(a) showing a first optical blocking structure and FIG. 8(b), a second optical blocking structure.

FIGS. 8 show vertical sections of the surroundings of the dent $204_1$ in the embodiment of the invention after being filled with resin. After the first light receiving element $203_1$ is fitted to the optical waveguide substrate 201 as stated above, resin 242 having transmissivity in the wavelength range of signal lights is injected into the dent $204_1$ from the groove 224 shown in FIG. 5 and FIG. 6. Then the inside of the dent $204_1$ is filled with the resin 242 until the top of the first light receiving element $203_1$ is covered with it. As shown in FIG. 8(a), the top of this resin 242 is further covered with optical blocking resin 243 having transmissivity in the wavelength range of no signal light.

The resin 242 is an insulator so that no short circuiting can occur even if it comes into contact with the electrode portion of the light receiving element $203_1$ or the pedestal connected to the electrode pattern. The optical blocking resin 243 also is an insulator so that no short circuiting can occur even if it comes into contact with an electrode pattern(not shown) formed on the claddings. The resin 242 is filled in an island state, in which the first through Nth the light receiving elements $203_1$, $203_2$, ... $203_N$ are independent of one another as shown in FIG. 1, and the top of each is covered with the optical blocking resin 243. This arrangement makes it possible to effectively reduce optical crosstalk due to stray lights which are apt to occur in a structure in which light receiving elements are arrayed adjoining each other. Incidentally, silicon resin is used as the resin 242, and epoxy resin or the like, as the resin 243.

Figure 8B:
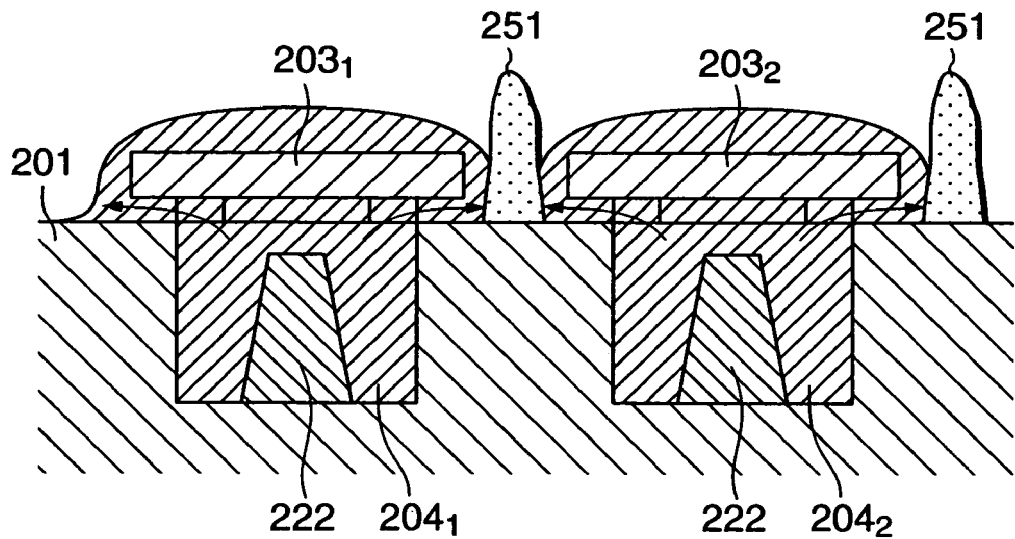
FIGS. 8 show vertical sections of the surroundings of light receiving elements of the optical waveguide device, which is the first embodiment of the invention.

FIG. 8(b) shows another structure for preventing optical crosstalk from arising. In the structure shown in FIG. 8(a), the optical blocking resin 243 is applied so as to cover the top face of the resin 242. On the other hand, in the structure shown in FIG. 8(b), a wall 251 consisting of optical blocking resin is arranged between the light receiving elements $203_1$ and $203_2$. This disposition can prevent lights leaking out of gaps between the light receiving elements $203_1$ and $203_2$ and the optical waveguide substrate 201 from entering into any other channel. Incidentally, epoxy resin or the like is used for the wall 251.

As described above, in this embodiment of the invention, stray lights in not only the area of the first through Nth light receiving elements $203_1$, $203_2$, ... $203_N$ but also in that of the first through Nth cores $202_1$, $202_2$, ... $202_N$ are provided against as shown in FIG. 4. As a result, even if the degree of integration of the light receiving elements 203 over the optical waveguide 200 increases, optical crosstalk between different wavelengths or between channels can be effectively reduced. Therefore, the optical waveguide 200 can be enhanced in the degree of integration and improved in performance at the same time. This makes it possible to reduce the size, and accordingly the cost, of optical waveguide devices.

Figure 9A:
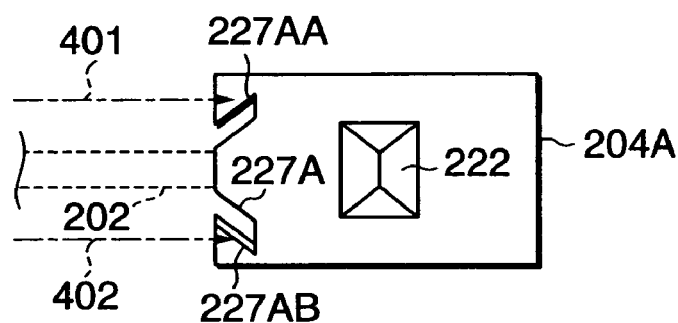
FIGS. 9 show plans of modified versions of the structure around a dent in the optical waveguide device, which is the first embodiment of the invention.

FIGS. 9 illustrate modified versions of the structure around a dent according to the invention. In one version shown in FIG. 9(a), projections together forming a V shape are provided, one on each side, at an end face of the core 202 on the wall surface 227 where the end face of the core 202 is exposed. If film formation in the slanted fashion described with reference to FIGS. 7 is applied to such a wall surface 227A, a film of optical blocking material will be formed over each of two faces 227AA and 227AB. In this way, the two faces 227AA and 227AB can block stray lights 401 and 402, which would otherwise input into a dent 204A, from doing so. As a result, the detection output of the light receiving elements 203 (not shown in this drawing) can be prevented from being affected by stray lights arriving from other channels or elsewhere.

Figure 9B:
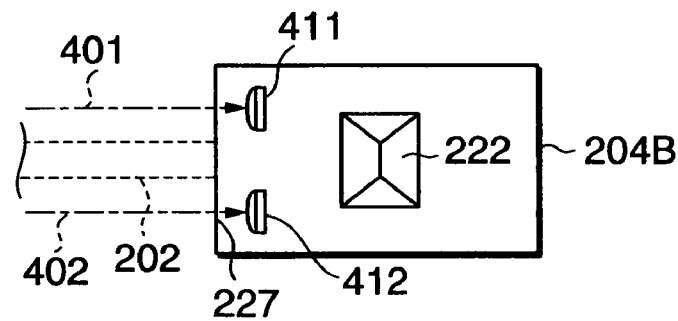

In the other version shown in FIG. 9(b), reflective stubs 411 and 412 are arranged in positions which are located between the wall surface 227, where the end face of the core 202 is exposed, and the mirror 222 and where lights being inputted from elsewhere than the end face of the core 202 can be avoided. These reflective stubs 411 and 412, too, are formed of films of optical blocking material in the slanted fashion described with reference to FIGS. 7 on the side opposite the wall surface 227. The stray lights 401 and 402 which would otherwise input on the dent 204B from elsewhere than the core 202 are blocked by these reflective stubs. As a result, adverse effects on the light receiving elements 203 (not shown in this drawing) can be suppressed.

Figure 10:
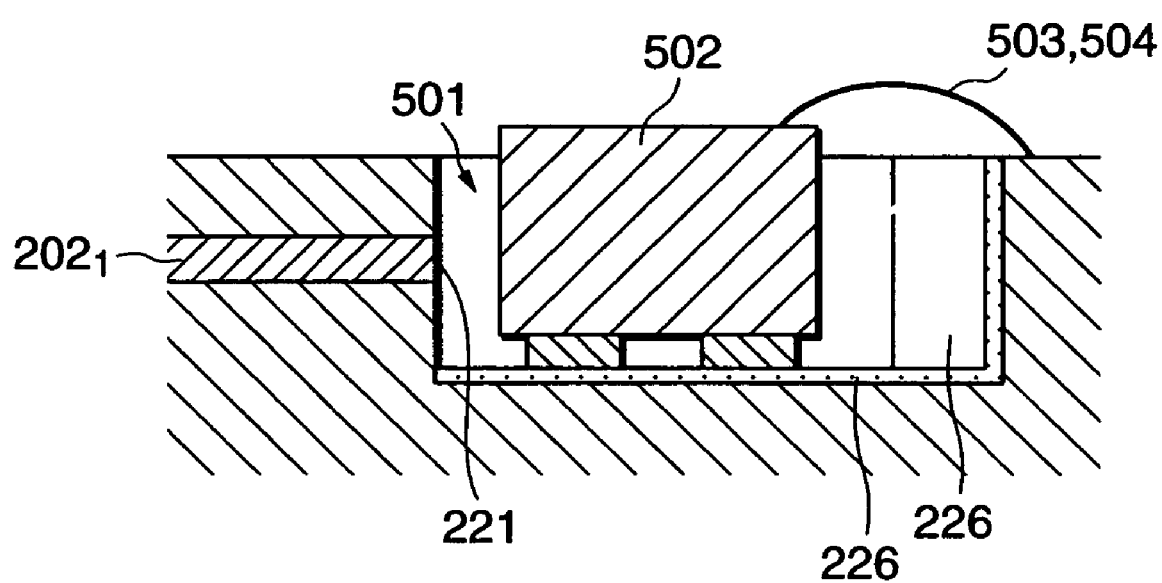
FIG. 10 shows a cross section of the configuration of an optical waveguide device, which is a second preferred embodiment of the invention.

FIG. 10 shows a cross section of the surroundings of a dent provided in an optical waveguide device as a second preferred embodiment of the invention. In FIG. 10, the same constituent parts as in FIG. 6 are denoted by respectively the same reference signs, and their description will be dispensed with. A dent 501 in this second embodiment, formed in the same fashion as the dent $204_1$ in the foregoing embodiment (see FIG. 6), accommodates no mirror. A photodiode 502 is firmly fitted to the bottom face of the dent 501 as a light receiving element. The photodiode 502 directly receives light emitted from the end face 221 of the first core $202_1$. The output current of the photodiode 502 is connected to an electrode pattern (not shown) on the surface of the optical waveguide substrate via wires 503 and 504 connected to the top face of the photodiode 502. In this second embodiment of the invention, too, a film 226 of optical blocking material is formed over the inside faces of the dent 501 other than the face containing the end face 221 of the first core $202_1$. This film can be formed by the method of film formation described with reference to FIG. 7. By using metal as the material of the film to be formed on the bottom face of the dent, at least one of the electrodes of the photodiode 502 can be connected via the metallic film 226 on the bottom face of the dent. It is also possible to dispense with the electrode pattern on the surface of the optical waveguide substrate by mounting a photodiode (not shown) fixed to the subcarrier.

Figure 11:
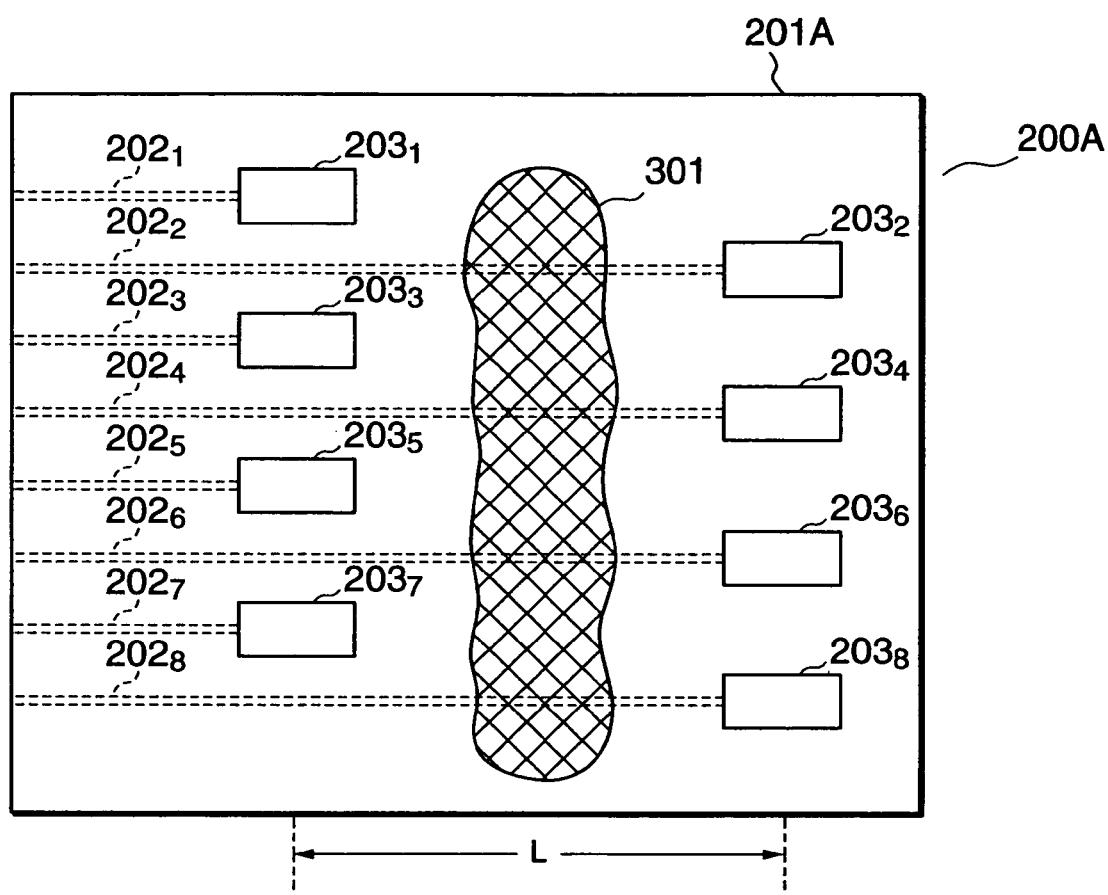
FIG. 11 shows a plan of the configuration of an optical waveguide device, which is a third preferred embodiment of the invention.

Although in the embodiments of the invention so far described, the optical blocking material film 226 is not formed all over the wall surface 227 including the end face 221 of the core, it is also possible to form the optical blocking material film 226 all over the wall surface 227 with only the end face 221 of the core being excluded. This would result in a further reduction of optical crosstalk. FIG. 11 illustrates the configuration of an optical waveguide device as a third preferred embodiment of the invention. In FIG. 11, the same constituent parts as in FIG. 1 are denoted by respectively the same reference signs, and their description will be dispensed with. In this optical waveguide 200A, odd-number (such as first, third and so forth) light receiving elements $203_1$, $203_3$, ... $203_7$ on the optical waveguide substrate 201A are arranged in one column, and even-number (such as second, fourth and so forth) light receiving elements $203_2$, $203_4$, ... $203_8$ are arranged on another column. These two columns are apart from each other at a prescribed distance L. This zigzag arrangement of the first through eighth light receiving elements $203_1$, $203_2$, ... $203_8$ doubles the lateral spacing of the light receiving elements 203 and thereby reduces optical crosstalk.

Figure 12:
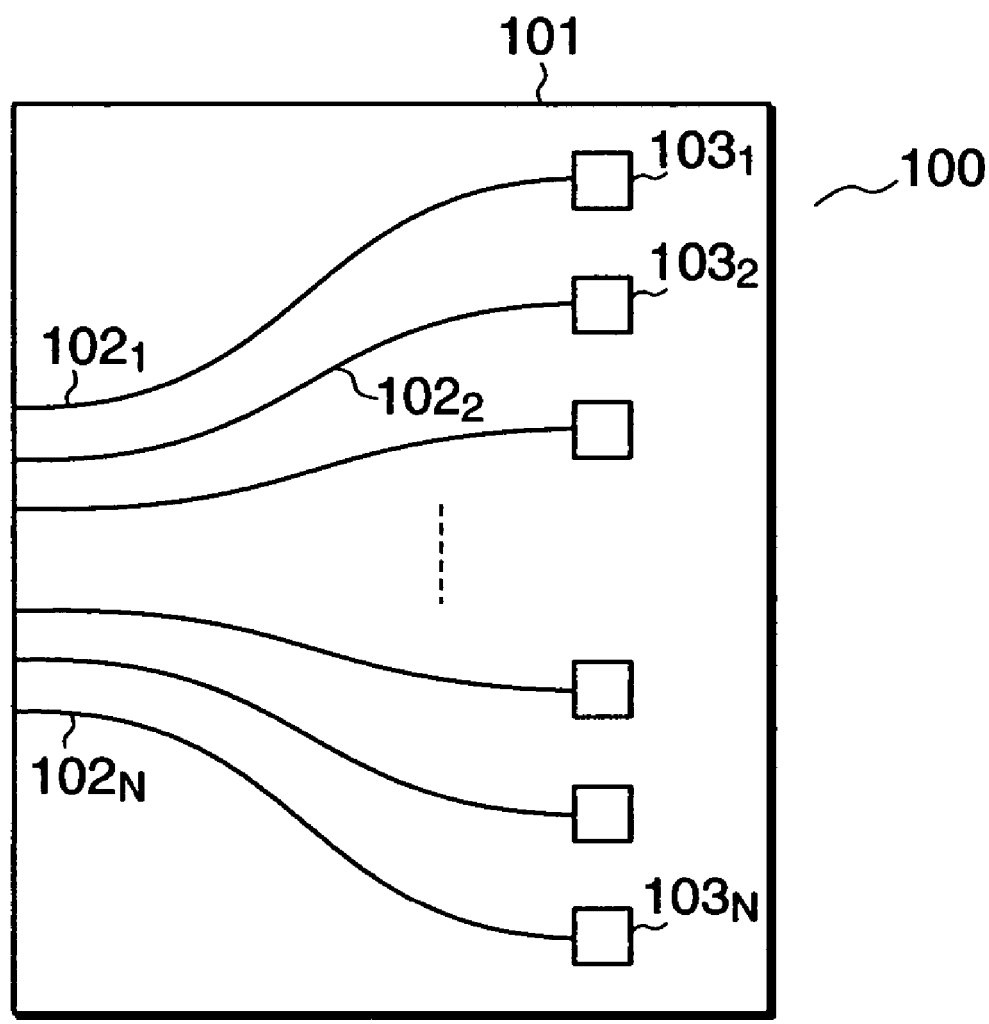
FIG. 12 shows a plan of the configuration of the optical device according to the prior art.

This point will now be described as it relates to FIG. 12. Generally speaking, in trying to reduce optical crosstalk in arrayed multi-channel optical waveguides with light receiving function, the optical waveguides are fanned out by using curved optical waveguides as shown in FIG. 12. The square measure increment of the optical waveguide substrate 101 (FIG. 12) in this configuration will be considered below. In the following mathematical expressions, the spacing between the optical waveguides before fan-out is represented by P1; that after fan-out, by P0; the number of the optical waveguides, by N; and the minimum radius of curvature, by R.

In this case, the width increment of the optical waveguide substrate 101, represented by $h_{101}$, can be expressed in Equation (1) below.

$$h_{101}=(P_0-P_1)*(N-1) \tag{1}$$

The length increment of the optical waveguide substrate 101, represented by $W_{101}$, can be expressed in Equation (2) below.

$$w_{101}=\sqrt{(h_{101}R/2-h_{101}^2/8)} \tag{2}$$

On the other hand, the light receiving elements are supposed to be arranged in a zigzag fashion as in this second embodiment. In the following mathematical expressions, the spacing between the columns is represented by L; the width of the optical waveguide substrate 201A in the zigzag arrangement, by $h_{201}$; and the length increment, by $w_{201}$. The width $h_{201}$ can be expressed in Equation (3), and the length increment $w_{201}$, by Equation (4) below.

$$h_{201}=P_1*(N-1) \tag{3}$$

$$w_{201}=(N-1)*P_1*L \tag{4}$$

On the basis of the foregoing, a case in which the distance to the nearest light receiving element ($P_0$, L) is extended to a desired length is supposed. By using the zigzag arrangement under a condition that the square measure increment ($L*h_{201}$) of the optical waveguide substrate 201A be smaller than the square measure increment attributable to the fan-out(($h_{201}+h_{101})*w_{101}$), the square measure of the optical waveguide substrate 201A can be made smaller than that of the optical waveguide substrate 101. Furthermore, an optical blocking member 301 is applied in a strip shape on the top face of the optical waveguide substrate 201A between the column of the even-number light receiving elements $203_2$, $203_4$, ... $203_8$ and that of the odd-number light receiving elements $203_1$, $203_3$, ... $203_7$. This enables lights leaking from one column of light receiving elements to the other column of light receiving elements to be significantly reduced. Epoxy resin or the like is used for this optical blocking member 301. It is possible to further reduce optical crosstalk in the optical waveguide 200A by additionally using the measures against stray lights described with reference to the earlier embodiments. This makes possible a high degree of integration and a size reduction to achieve a cost saving of the optical waveguide device. Increasing the number of columns would enable an even higher degree of integration to be attained.

As hitherto described, according to the present invention, signal lights between channels can be separated on a cladding-by-cladding basis. This enables lights leaking from cores to be prevented from entering into other cores or other light receiving elements, and accordingly makes possible a reduction in optical crosstalk. Furthermore, since the claddings are covered on the top face with electrically insulating material according to the invention, even if they come into contact with an electrode pattern or electronic part, no short circuiting can occur. Therefore, it is made possible to mount an electrode pattern and/or electronic parts over the top face of the claddings and thereby to effectively utilize the top face space of the claddings. Also, according to the invention, as the groove inside faces can be coated in the film formation process, even very fine grooves can be coated. It is further possible to coat a plurality of grooves at the same time and thereby to reduce the number of manufacturing man-hours required. For the reasons cited so far, the invention makes it possible to improve performance against optical crosstalk, enhance the degree of integration of components, reduce the size of the optical waveguide device, shorten the manufacturing process and correspondingly reduce the cost.

Furthermore, according to the invention, as dents are provided in the optical waveguide substrate to receive lights from cores and coated inside with optical blocking material, light leaks from the dents to other channels can be restrained. Therefore, the light receiving section also contributes to preventing optical crosstalk from worsening.

Moreover, as the insides of the dents are coated with films formed in a slanted fashion according to the invention, a plurality of dents can be coated at the same time and in a simple process.

Also, according to the invention, optical paths are protected by filling the dents with optically transmissive material, which is coated with optical blocking material to prevent stray lights from leaking out. Since this optical blocking material is electrically insulating, its contact with an electrode pattern or the like would not invite short circuiting. Therefore, the degree of integration of components can be enhanced. Incidentally, arrangement of this optical blocking material between the light receiving elements, instead of coating the top faces of each light receiving element with it, would provide the same effect. Furthermore, according to the invention, the zigzag arrangement of odd-number and even-number light receiving elements can double the spacing between adjacent light receiving elements and thereby reduce optical crosstalk. Moreover, the arrangement of optical blocking material between the odd-number and even-number columns according to the invention can further contribute to optical crosstalk reduction.

While the invention has been described with reference to certain preferred embodiments thereof, it is to be understood that the subject matter encompassed by this invention is not to be limited to those specific embodiments. Instead, it is intended for the subject matter of the invention to include all such alternatives, modifications and equivalents as can be included within the spirit and scope of the following claims.

What is claimed is:

1. An optical waveguide device comprising,
   a substrate,
   a metal layer arranged on said substrate,
   at least one of claddings arranged on said metal layer and in said claddings dents are formed,
   at least one of cores arranged in said claddings, whose end faces are exposed on sides of said dents, for transmitting lights,
   optically non-transmissive material coating the inside faces of said dents except the sides on which the end faces of said cores are exposed,
   at least one of light receiving elements for receiving lights emitted from the end faces of said cores, and
   at least one of mirrors formed in said dents, for reflecting said lights emitted from the end faces of said cores and inputting said lights into light receiving faces of said light receiving elements.

2. The optical waveguide device, as claimed in claim 1, wherein said cores, said dents, said mirrors and said light receiving elements are paired and provided in a plurality each.

3. The optical waveguide device, as claimed in claim 1, wherein:
   optical paths from the end faces of said cores to the light receiving faces of said light receiving elements and the surroundings of said light receiving elements are filled with optically transmissive and electrically insulating material, the top of said optically transmissive and electrically insulating material being covered with optically non-transmissive and electrically insulating material.

4. The optical waveguide device, as claimed in claim 1, wherein:
   optical paths from the end faces of said cores to the light receiving faces of said light receiving elements and the surroundings of said light receiving elements are filled with optically transmissive and electrically insulating material, and said light receiving elements are blocked from each other by optically non-transmissive material.

5. The optical waveguide device, as claimed in claim 1, wherein:
   said mirrors are wedge-shaped projections fixed to the bottom faces of said dents.

6. The optical waveguide device, as claimed in claim 1, wherein:
   projections for blocking lights from being inputted into said dents elsewhere than from the end faces of said cores are formed on both sides of the end faces of said cores.

7. The optical waveguide device, as claimed in claim 1, wherein:
   projections for blocking lights from being inputted into said dents elsewhere than from the end faces of said cores are formed on both sides of the end faces of said cores and on the bottom faces of said dents.

8. The optical waveguide device, as claimed in claim 2, wherein:
   said plurality of light receiving elements are divided into odd-number and even-number groups, which are arranged with some spacing between them, and said odd-number and said even-number groups are blocked by optically non-transmissive material.

* * * * *